United States Patent [19]

Kühel

[11] Patent Number: 5,004,346

[45] Date of Patent: Apr. 2, 1991

[54] METHOD OF EXAMINING AN OPTICAL COMPONENT

[75] Inventor: Michael Kühel, Oberkochen, Fed. Rep. of Germany

[73] Assignee: Carl-Zeiss-Stiftung, Oberkochen, Fed. Rep. of Germany

[21] Appl. No.: 426,772

[22] Filed: Oct. 26, 1989

[30] Foreign Application Priority Data

Oct. 27, 1988 [DE] Fed. Rep. of Germany ....... 3836564

[51] Int. Cl.$^5$ .............................................. G01B 9/02
[52] U.S. Cl. .................................................. 356/360
[58] Field of Search ............................... 356/359, 360

[56] References Cited

U.S. PATENT DOCUMENTS

| | | |
|---|---|---|
| 3,740,750 | 6/1973 | Munnendyn ........................ 356/360 |
| 4,074,937 | 2/1978 | Zanoni . |
| 4,387,994 | 6/1983 | Balasubramanian . |
| 4,396,289 | 8/1983 | Fantone . |
| 4,696,572 | 9/1987 | Ono ..................................... 356/360 |
| 4,743,117 | 5/1988 | Kitabayashi et al. . |

OTHER PUBLICATIONS

"Rotating Scan Interferometer" by P. Langenbeck, Proceedings of SPIE, vol. 396 (1983), pp. 99–101.

*Primary Examiner*—Davis L. Willis
*Assistant Examiner*—Matthew W. Koren
*Attorney, Agent, or Firm*—Walter Ottesen

[57] ABSTRACT

The invention is directed to a method for testing optical components and tests can be made on aspherical surfaces or, more specifically, on aspherical wavefronts. For this purpose, the collimator of an interferometer which generates the test wave is displaced relative to the test component and interferograms are electronically registered by means of an image sensor in different positions of the collimator and are stored as light path length differences between the test beam and the comparison beam for the individual image points of each interferogram. The relative position between the collimator and the test component is additionally measured with high precision. Thereafter, the light path length differences which were measured interferometrically are compared with desired light path length differences computed for the different positions of the collimator or determined by calibration. From this comparison, the aspheric form of the wavefront of the test component is computed. For this computation, the measured values obtained for the different component regions of the test component are integrated over the entire surface of the test component with the measured regions being those wherein the test wave falls essentially perpendicularly onto the surface of the test component.

15 Claims, 5 Drawing Sheets

METHOD OF EXAMINING AN OPTICAL COMPONENT

FIELD OF THE INVENTION

The invention relates to a method for examining an optical test component which supplies aspherical wavefronts. The method is carried out with the aid of an interferometer having a collimator generating a test wave with the collimator being displaceable relative to the optical test component.

BACKGROUND OF THE INVENTION

The interferometric examination of the form of rotational symmetrical, aspherical lens surfaces or mirror surfaces is conventionally carried out in that a test wave usually having a spherical waveform is reflected at the component under test. Thereafter, the difference of the optical light path length with respect to a known reference surface is determined for the different points of incidence. This reference surface is usually arranged in a reference arm of the interferometer whereby interference patterns are produced with coherent light. The actual form of the surface can be determined when these interference patterns are evaluated quantitatively.

The process described above is only possible for surfaces which are only slightly aspherical and for which the deviation from a sphere corresponding closely thereto is only very slight. In contrast to these aspherical surfaces, the deviation between the spherical test wave and the aspherical surface to be tested is as a rule so great that the above-described method can no longer be applied in this simple form. The test rays impinge perpendicularly in only a narrow zone on the aspherical surface to be tested, namely, at that location where the spherical test wave touches the asphere. Beyond this zone, the deviations between the directions of the incident and reflecting rays become ever greater. Ultimately, the reflected rays are no longer received by the downstream optic and are completely lost for the interference pattern to be generated. However, rays which nonetheless pass through all optics and diaphragms exhibit considerable light path length differences of many wavelengths and generate fringe distortions in the interferogram which are so great that an evaluation of the interferogram is no longer possible.

For the above reasons, special optical lens systems known as so-called compensation systems are placed in the beam path of the test wave for testing aspherical surfaces. These compensation systems coact with the desired asphere to be tested to again provide a stigmatic wave. The compensation systems therefore adapt the wavefront of the test wave to the form of the asphere to be tested. A defective test component then generates only small light path length differences to the reference wave. The interference fringes are therefore only slightly distorted and the interferogram can thereby be evaluated quantitatively.

However, these methods only function accurately when the optical effect of the manufactured compensation system is precisely known since this system is included in the test result. It is not possible to examine the compensation system in and of itself. For this purpose, a master aspherical component must be made available which, in turn, cannot be precisely tested.

The compensation systems must therefore be manufactured with the greatest of care and highest obtainable precision. All parameters which get included in the optical result must be precisely maintained and individually measured. These parameters include the index of refraction of the glass material used, the homogeneity of the glass material, the lens radii, lens thicknesses, and air distances as well as the adaptation of the lenses to each other. The frame must guarantee the precise centering. However, even with this considerable effort, no defect-free compensation system can be produced.

In order to avoid the above-mentioned problem, the suggestion has already been made that the compensation system be replaced with synthetic holograms. Such a method is, for example, disclosed in U.S. Pat. No. 4,396,289. These holograms are especially computed for adaptation to the asphere to be tested and can be plotted on a suitable carrier. However, as a rule, synthetic holograms alone are not adequate to adapt the wavefront to the component to be tested. The holograms must therefore often be combined with lens compensation systems of simple configuration. However, this again is associated with an adjustment. The correct masking out of unwanted diffraction orders present further difficulties. Such masking out can require a so-called "off-axis" angle for establishing the hologram. Other difficulties are the low diffraction efficiency in the holograms and the wavefront errors caused by the hologram carrier itself. For these reasons, although computer holograms can be used in laboratories, they can hardly be utilized in production facilities where the simplest possible configuration is wanted.

It is also already known to record the interferograms with a camera and to evaluate the interferograms with a computer coupled to the camera. The aspheres can then be illustrated in the same mathematical form in which they were formulated. With interferometers of this kind, it is possible to do without a complete compensation of the wavefront of the test wave. Rather, a simple compensation optic is used and a part of the measuring range of the interferometer is used to measure the remaining residual of the asphericality which the compensation optic leaves and to eliminate the same from the test result by computation. However, this method has limits since the measuring range which can be evaluated at large deviations between the test aspherical component and the wavefront of the test wave is quickly reached.

It has also been suggested to test aspherical components interferometrically by sections. For this purpose, ring-shaped component regions of the aspherical component are sequentially interferometrically measured with these component regions having a form corresponding to the wavefront of the testing wave adapted to these component regions. A method of this kind is disclosed, for example, in U.S. Pat. No. 4,743,117. In this method, a test wave with a ring-shaped aperture is directed onto the surface of the asphere to be tested. Displacing the asphere assures that the test wave is again reflected approximately in autocollimation and thereafter, the reflected annular bundle of rays is evaluated with the aid of a Shearing interferometer.

However, no reliable connection of the tested component regions to each other is obtainable. Instead, the measurement errors are additive over the sequential connection of tested component regions so that the total form of the asphere can be determined only with a relatively large measurement uncertainty.

A test arrangement for aspheres on the basis of a so-called Fizeau interferometer is described in an article entitled "Rotating Scan Interferometer" by P. Langenbeck appearing in the journal "Proceedings of the SPIE", Volume 396 (1983), pages 99 to 101. In this method, the Fizeau objective is displaceable relative to the test component. Here too, ring-shaped component regions of the aspheres are examined sequentially with respect to manufacturing nonuniformities More specifically, it is those annular zones which are examined wherein the osculating radius of the asphere corresponds to the spacing of the focus point of the spherical reference wave generated by the Fizeau objective.

In this arrangement too, the tested component regions cannot easily be connected to each other in such a manner that the form of the entire asphere results therefrom. This condition is present because the relative position between the collimator objective and the test component is not measured so that no computed connection of the component regions to each other is possible. Furthermore, the optical light path length difference in the test arm of the interferometer changes for the total test surface because of the displacement of the Fizeau objective whereby the correspondence of the individual interference orders to one another in the different positions of the objective is lost.

U.S. Pat. No. 4,074,937 teaches that an axially displaceable collimator optic can be provided in a Fizeau interferometer between the reference surface of the Fizeau objective and the test component for examining surfaces having relatively large radii. The displacement of this collimator optic adapts the radius of the test wavefront to test components with different radii. A measurement of aspherical test components is not described in this patent.

U.S. Pat. No. 4,387,994 describes a Twyman-Green interferometer wherein an aspherical test component in the test arm of this interferometer is measured against a reference object mounted in the reference arm of the interferometer. The interferograms are here evaluated electronically with a CCD-camera. Either the test object or the reference object is axially displaced and the points of maximum contrast for the different positions are statistically evaluated. It is especially disadvantageous in this method that a corresponding reference object is required for each asphere to be tested.

SUMMARY OF THE INVENTION

It is an object of the invention to provide a method and an arrangement for testing optical components which supply aspheric wavefronts by means of which test objects having various asphericality can be measured in the simplest possible manner and wherein especially the total surface of the test object, that is the aspheric wavefront generated by the test object, can be determined absolutely with high precision.

Not only aspheric surfaces of lenses or mirrors are intended to be included as optical components which supply aspheric wavefronts. Also lenses having spherical surfaces which are tested by passing light rays therethrough transform an incident planar wave into an aspheric wave with a considerable amount of asphericality, under circumstances. The method of the invention is therefore also suitable for testing spherical lenses in transmission.

The method of the invention is for examining an optical test component which supplies aspherical wavefronts. The method is carried out with the aid of an interferometer having a collimator generating a test wave and the collimator is displaceable relative to the optical test component. The method of the invention includes the steps of: making interferograms for different positions of the collimator at which component regions of the test wave are adapted to the test component; measuring the relative position between the collimator and the test component with high precision for the different positions; electronically registering the interferograms by means of an image sensor and storing the interferograms as light path length differences $L_{act}(h)$ between the test beam and the comparison beam of the interferometer for the individual image points of each interferogram; computing desired light path length differences $L_{des}(h)$ for the different positions of the collimator; comparing the interferometrically measured light path length differences $L_{act}(h)$ to the desired light path length differences $L_{des}(h)$ with the phase errors $\Delta\phi(h)$ being formed for the individual image points; and, computing the errors of the aspheric form of the wavefront of the test component as a whole from the comparisons and the phase errors.

With the method according to the invention, the asphericality of the test component is not compensated at once but instead successively in component regions which are disposed one next to the other in that the relative position between the collimator and the test component is changed and only the component region compensated for this position is evaluated. The results of the sequential evaluations of the component regions can, however, be superposed without difficulty and connected one to the other since the relative position is measured precisely and the result of the position measurement is considered for the evaluation of the interferograms. Furthermore, the connection of the phase position of the test wave in all component regions of the asphere is always assured at the apex of the asphere if the light path length on the axis of the test arm of the interferometer is held constant which is always possible with a displacement of the collimator and even with a displacement of the test component when the latter is tested in transmission. With these measures, the form of the aspherical wavefront to be tested can therefore be determined absolutely with high precision.

The number of individual displacement steps which are necessary is dependent upon the specific measuring task and is determined by various factors described below.

The overlap of the measured component regions of the asphere should be so large from one step to the next that the redundancy of the method reduces errors which occur by chance.

The maximum step width is dependent upon how good the wavefront of the test wave is adapted to the asphericality of the test component, that is, how much the asphere deviates from the test wave.

The step width is furthermore determined by the useable measuring range wherein the interference patterns can be evaluated. The number of image points or the resolution of the camera used with which the interferograms are taken is an important indicia.

It is furthermore important that a measuring operation does not take too long so that the influence of changing ambient conditions such as thermally conditioned drift does not falsify the result. It is therefore advantageous to displace the collimator for each test operation in both directions along the optical axis, for example, in the direction toward the test component and then immediately thereafter a second time along the same path back and then to form the average value of the measured values. In this way, the linear component of such error influences is compensated.

As a collimator, an optic can be used which transmits an approximately spherical wave in the direction toward the test component. It is then advantageous to determine deviations of this wavefront from an exact sphere either before or after the measurement of the test component by means of a calibration measurement on a known good spherical mirror which corresponds approximately to the best-adapted sphere of the test component. The deviations determined in this manner lie in an order of magnitude of fractions of the wavelength and are then taken into consideration during the evaluation of the interferograms of the test component. However, it is especially advantageous to use a single lens as a collimator. Such a single lens is in many cases already in a condition to provide a compensation for a large portion of the asphericality of the test component. This makes it possible to reduce the number of the different positions of the collimator in which the measurements are carried out. If part of the asphericality of the test component is already taken up by the individual lens, then the compensated regions on the test component which must be recorded sequentially are much wider and the entire displacement distance for the collimator in the direction along the optical axis is less.

If one selects a single lens as the collimator, then it is advantageous to compute the exact form of the wavefront emanating from the single lens from its lens data and then to consider the same during the evaluation of the interferograms of the test component, that is, during the determination of the desired light path length differences in the test arm of the interferometer. The computation of the actual light path length differences presents no problem with respect to modern computers when considering the optical data only for a single lens, that is, the parameters of two radii, apex thickness and the index of refraction of the glass.

At this point, it should be mentioned that the form of the test wave generated by the single lens can also be determined in a manner alternately to the computated determination referred to above. Thus, the form of the test wave can be determined in that the collimator is displaced relative to a spherical mirror (opposite to the actual test procedure) and that interferograms are taken for various positions. As an analog to the actual evaluation process carried out for the actual test, the asphericality of the test wave can be determined by means of the evaluation of the corresponding interferograms for the spherical mirror.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
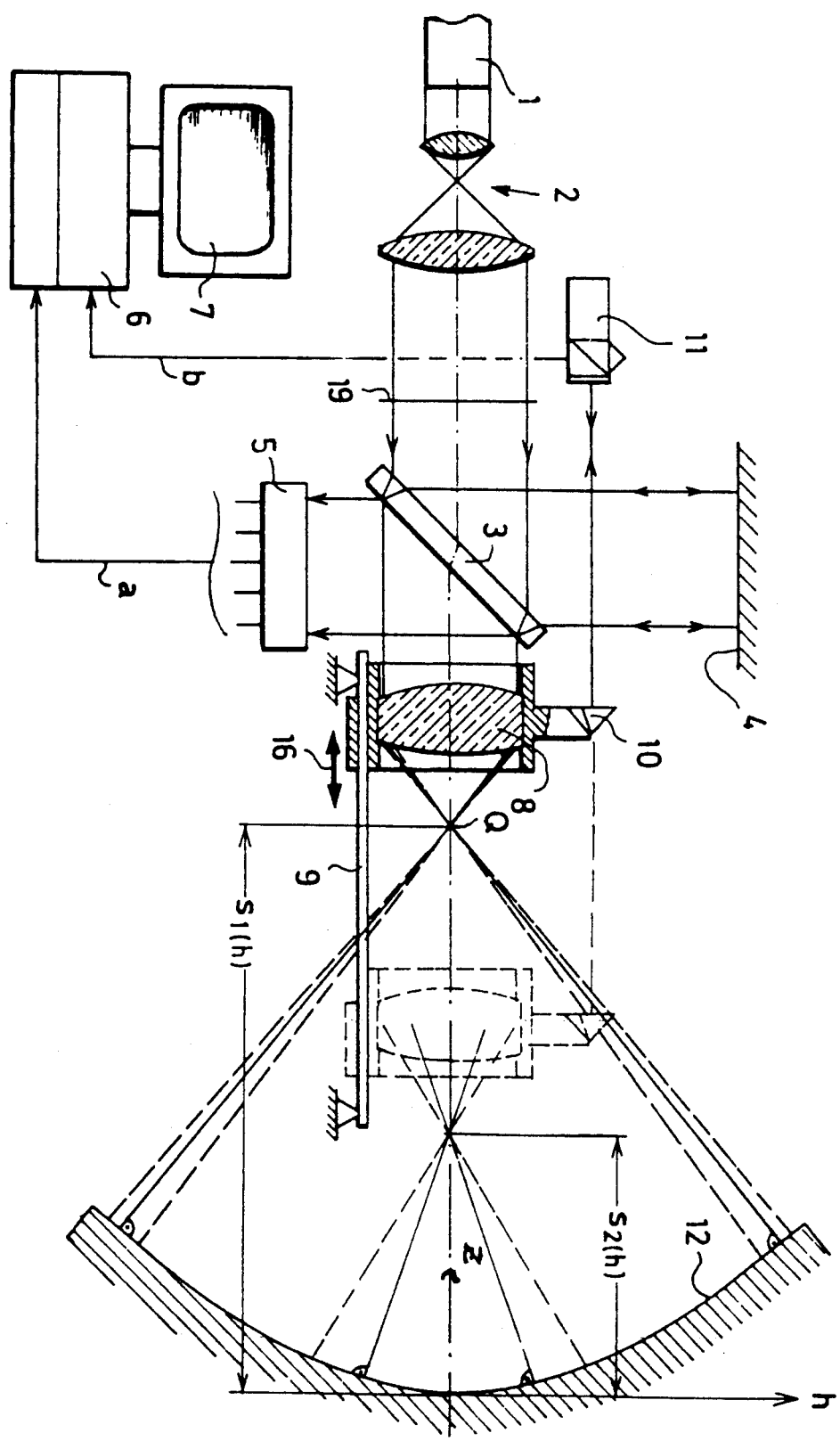
FIG. 1 is a schematic showing the optical configuration of the interferometer arrangement according to the invention for testing aspherical concave mirrors.

The test arrangement shown in FIG. 1 is based upon a Twyman-Green interferometer. A laser 1 is provided as a light source and an expansion optic 2 is mounted downstream thereof. The planar wave which emanates from the expansion optic 2 is symbolized in FIG. 1 by the line 19. This planar wave falls on the beam splitter 3 of the interferometer and is divided into two components so that one component is directed to the reference arm of the interferometer and the other component is directed to the testing arm thereof.

A planar mirror 4 is mounted in the reference arm whereas a collimator 8 is positioned in the test arm. The collimator 8 will be described in greater detail below. The explanation which follows is based upon the premise that this collimator 8 generates a test wave having a precisely spherical wavefront.

The component to be tested or test component 12 is mounted downstream of the collimator 8 and is an aspherical concave mirror in the embodiment now to be described. The test wave emanating from the collimator 8 is reflected by the test component 12 and passes again through the collimator 8 and back to the beam splitter 3. At the beam splitter 3, the test wave and the reference wave interfere and the interferogram resulting therefrom is detected by a CCD-camera 5 mounted at the output of the interferometer. The camera 5 is connected via a line (a) and a suitable interface to a computer 6. The interferograms or the graphic utilized to illustrate the form of the test component can then be shown on the display screen 7 of the computer 6.

With the aid of a precision guide 9, the collimator 8 can be displaced along the optical axis in the test arm of the interferometer toward and away from the test component 12 as indicated by arrow 16. The position of the collimator 8 along the optical axis is determined by a separate laser interferometer 11 which makes measurements to a triple prism mounted on the holder of the collimator 8. The corresponding measured position values are likewise transmitted to the computer 6 via the connecting line (b). Another measuring system having an adequately good resolution such as an incremental scale measurement system can be utilized in lieu of the interferometer (10/11).

Since the test wave is intended to be a perfectly spherical wave, all rays falling on the test component 12 emanate from the focus point identified by reference letter Q in FIG. 1. The usable measuring range and therefore the displacement range of the collimator 8 is so selected that at least one component region from the aperture of the test wave falls perpendicularly on the edge zone of the test component 12 in one of the two extreme end positions and perpendicularly on the apex zone in the other one of the extreme end positions. Other zones of the test component 12 having a different elevation (h) can be optimally tested at respective intermediate positions, that is, at those intermediate positions where the test wave is tangent to the aspherical surface of the test component 12. The two positions shown in FIG. 1 lie very close to the respective end positions. At the first end position, the focus point Q is at a distance $S1(h)$ from the apex of the aspherical surface of the test component 12 and, at the second position, the focus point Q is at a distance S2(h) from this apex.

The optical path length for the ray on the optical axis in the test arm of the interferometer is not changed by the displacement of the collimator 8. The measurement of the interference phase for this region directly about the axis therefore permits a control of environmental influences such as thermal drift and, if required, a correction thereof.

The following describes how the measuring process is conducted for obtaining the interferograms and the process for evaluating these interferograms.

At the beginning of the measurement, the base adjustment of the collimator 8 to the test component 12 is made with the aid of a reference glass having a known radius; this base adjustment is the adjustment of the base distance from the collimator 8 to the apex of aspherical surface of the test component 12. The radius of the reference glass preferably corresponds to the radius of curvature of the test component 12 at the apex. First, this reference glass is seated in the interferometer arrangement and the collimator 8 is adjusted to straight lines with respect to the reference glass. The position of the apex of the reference glass relative to the stationary part of the interferometer is fixed with the aid of a sensitive mechanical-electronic feeler. The reference glass can now be exchanged for the aspherical test component 12 to be investigated with the position of the apex of the test component 12 being reproduced with adequate precision by the feeler.

During the actual measuring operation, interferograms are taken for various positions of the collimator 8 between the two extreme end positions shown in FIG. 1 and registered with the camera 5 and the interference phase is then computed from the registered brightness values in the region which extends directly about that zone wherein the test wave falls perpendicularly on the surface of the test component 12. On the other hand, the measured actual light path length differences for the pixel of CCD-camera 5 are computed from the registered brightness values in said region. The corresponding elevation (h) for this compensated zone can be computed from the equation Z(h) for the aspherical test component for each apex distance (s) at which interferograms were made. The interferometer 11 supplies the corresponding measured values for s(h). The measured light path length differences $I_{act}(h)$ are obtained therefrom.

The desired light path length difference for each point of the aspherical surface is now computed for a specific adjusted apex distance (s) which is present in the computer as a numerical value. In making these computations, the positions (x', y') of the individual pixels of the CCD-camera are the starting point for the lateral coordinate values (x, y) or $h=(x^2+y^2)^{\frac{1}{2}}$. The lateral coordinate values are imaged on the aspherical surface by the collimator 8. For ah imaging scale, $\beta'(s_o)$, the following is applicable:

$$h' = (x'^2 + y'^2)^{\frac{1}{2}} \quad (1)$$

$$h(s_o) = -\beta'(s_o) h' \quad (2)$$

The desired light path length difference $L_{des}(h)$ between the test beam and the comparison beam is:

$$L_{des}(h) = 2 \cdot \{const. - S_o + [(S_o - z(h))^2 + h^2]^{\frac{1}{2}}\} \quad (3)$$

wherein the constant is any desired constant which can be selected to zero.

In equation (3) above, all quantities are known, thus:
h results from the coordinates of the pixels and the selected apex distance $s_o$ according to equations (1) and (2);
z(h) is known from the formula for the desired aspherical surface; and,
$s_o$ is the adjusted apex distance of the collimator objective.

The errors of the aspherical surface are then obtained from the following:

$$L(h) = L_{act}(h) - L_{des}(h) \quad (4)$$

In the term $L_{des}(h)$, $s_o$ is a parameter and h is an independent variable. The term $L_{des}(h)$ can therefore be computed as a continuous function. The interferometric phase difference $\phi_{des}(h)$ results in the following from the desired light path length difference:

$$\phi_{des}(h) = 2\pi \frac{L_{des}(h)}{\lambda} \quad (5)$$

The term $\phi_{des}(h)$ of equation (5) is always given; the interferometrically actually measured phase difference $\phi_{act}(h)$ results from the actual light path length difference $L_{act}(h)$ according to the equation:

$$\phi_{act}(h) = 2\pi \frac{L_{act}(h)}{\lambda} \quad (6)$$

The term $\phi_{act}(h)$ is obtained from the interferometric measurement and evaluation process only with respect to a modulus of $2\pi$; the phase error of the aspheric surface is:

$$\Delta\phi(h) = \phi_{act}(h) - \phi_{des}(h) \quad (7)$$

and is therefore also only computable with respect to a modulus of $2\pi$.

However, the phase error $\Delta\phi(h)$ must be completely known so that the redundancy of the measurement process can be utilized, that is, so that the measurement results of different apex distances (s) for one and the same pixel of the CCD-camera can be averaged in a useful manner. In order to avoid this difficulty, it is not the phase errors, $\Delta\phi(h)$, themselves which are averaged but instead, the x-differences and y-differences of the phase errors of neighboring pixels. The unknown constant is caused to implicitly vanish by means of the differentiation in the x-direction and y-direction. When the completed result is available which is comprised of the weighted average of the x-differences and the y-differences between all pixels from which an interferogram resulted, the differences must be integrated to the actual error function. This presents no problem since the aspheric surface is continuous and therefore has no jumps with jump elevations of $m\lambda/2$ which would otherwise cause phase jumps of $(m \cdot 2\pi)$ between neighboring pixels.

Remaining wavefront errors effected by the collimator 8 itself can be rendered harmless by means of a calibration measurement on a known good spherical mirror. For this purpose and at the end of the measurement of the aspherical test component and when the complete result for the deviation of the actual wavefront from the desired wavefront of the aspherical test component is present, the wavefront measured on the spherical mirror is subtracted from this result. In the remainder which is left, the wavefront errors are now only referred to the errors of the spherical mirror used for the calibration and all other wavefront errors of the interferometer are then eliminated. Such interferometer errors include those of the beam splitter 3, the reference mirror 4 and the collimator 8. In contrast to aspherical surfaces, spherical reference mirrors can be manufactured with a high surface precision.

In equation (5), it was a condition precedent that the aspherical surface of the test component 12 is imaged on the CCD-camera 5 sharply and free of aberrations. This condition precedent has the same significance as the condition that the collimator is corrected for a finite image field. The light path is then the same for all possible rays falling on the test component and even for those rays which are shown in phantom outline in FIG. 1. Accordingly, not only the part of the surface of the aspherical test component on which the test wave impinges precisely perpendicularly is available for the evaluation, but also larger component regions of the surface of the test component so that the number of measurements (that is the different positions of the collimator 8) can be held down. The requirement for a corrected finite image field can be fulfilled, for example, if a photo objective or a microscope objective is used as a collimator. However, it is also possible to utilize a single lens having aberrations which already compensates for a large part of the asphericality of the test component. For this purpose, the convex lens (spherically undercorrected) is suitable for the concave test component 12 shown in FIG. 1. Since this convex lens is not corrected for a finite image field, the impinging ray must be explicitly computed for each axial position s(h) and for each elevation (h) or for each pixel of the camera 5 for determining the desired light path length differences $L_{des}(h)$. However, appropriate computer programs exist for this purpose.

It is not intended to provide a complete compensation of the entire test surface by means of the collimator 8. Accordingly, a small number of different high precision single lenses can be provided with which a plurality of different aspherical surfaces can be tested.

It was also a condition precedent that the movement of the collimator 8 be an ideal parallel displacement precisely along the optical axis in the test arm of the interferometer and it was intended that this optical axis be identical with the rotational axis of the test component 12. Deviations from this ideal movement cause measurement errors. Accordingly, a rotation of the collimator 8 about its nodal point causes a vanishingly small uniform increase of the light path for all rays of the compensated zone. The compensated zone is therefore falsely interpreted on the test component 12 as a depression. A lateral displacement of the collimator 8 without rotation effects a shortening of the light path length on that end of the compensated zone toward which the displacement took place and the same increase of the light path length is effected on the opposite-lying end. Between these ends, the light path lengths remain unchanged. Correspondingly, a tilt term is superposed on the measurement in the compensated zone. The tilt term can be eliminated when it is assured that no twisted surface is present produced by the manufacturing process for the test component 12 but rather that this component is rotationally symmetrical. The tilt term can be either determined by means of a computer and be subtracted or its measured components in the x and y directions can be utilized to adjust the collimator 8 in the desired position. For this purpose, the computer 6 in FIG. 1 can be connected in a closed-control loop with an adjusting device on which the collimator 8 is seated.

As an alternative to the foregoing, it is also possible to measure offset and tilt of the collimator 8 by means of additional equipment and to consider this displacement and tilt in the evaluation of the interferogram. Such additional equipment can be an autocollimation telescope or a linear interferometer.

Figure 2:
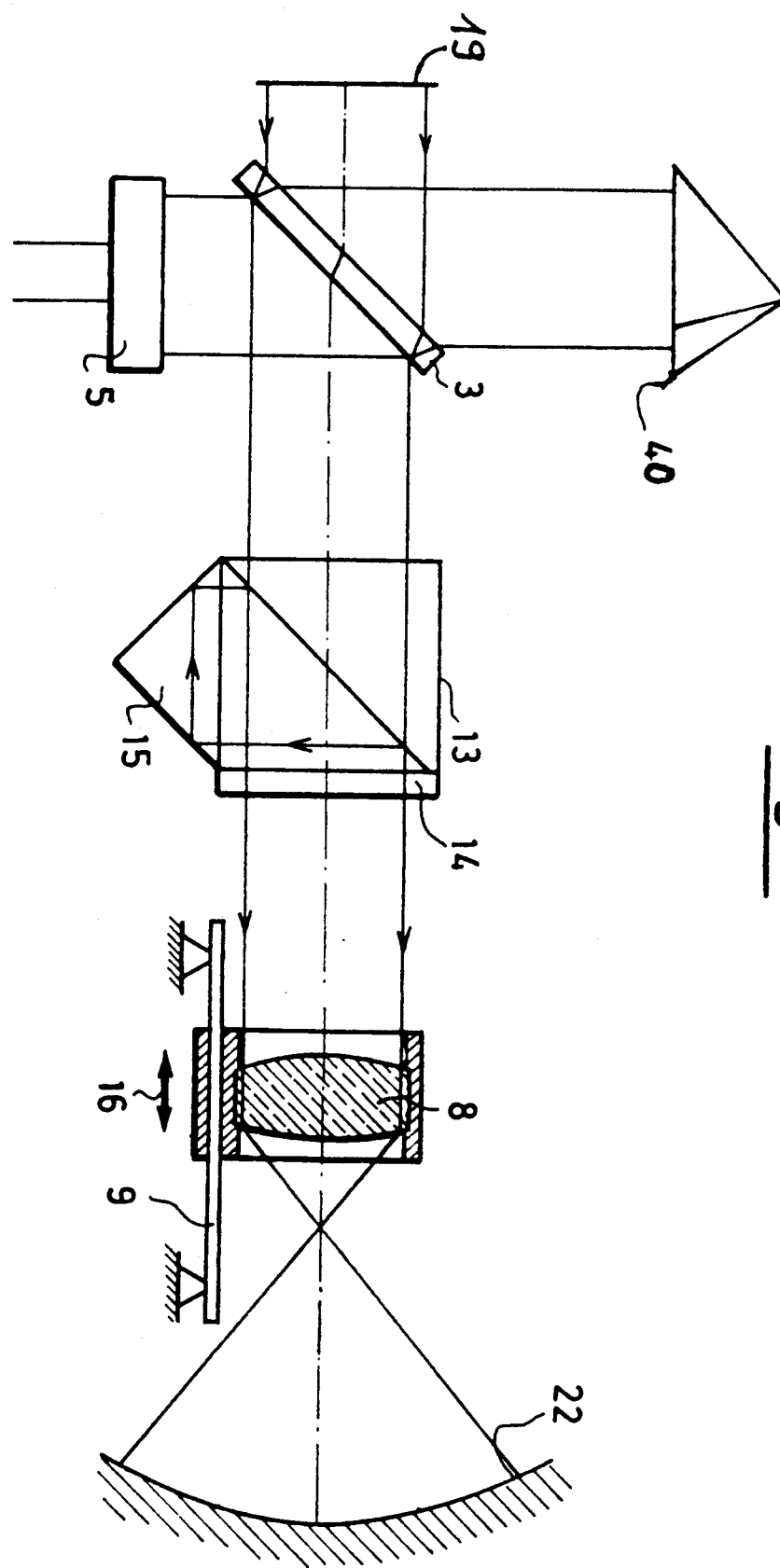
FIG. 2 is another embodiment of the interferometer arrangement according to the invention which is slightly modified compared to FIG. 1 in the test arm of the interferometer.

A further possibility for eliminating the tilt term while at the same time increasing the sensitivity of the interferometer arrangement by a factor of 2 can be obtained in the manner shown in FIG. 2 by inserting an optical double pass unit in the test arm of the interferometer. This double pass unit comprises a polarizing beam splitter cube 13 on which a so-called λ/4-plate 14 is seated on the side thereof facing toward the collimator 8. The test wave reflected from the test component 22 is laterally reflected when it again enters into the polarizing beam splitter cube 13 and this test wave is again transmitted out to the test component 22 after being deflected at a retroreflector (triple prism 15). However, the second test wave runs point symmetrical to the optical axis when compared to the first test wave. A triple mirror 40 is now disposed in the reference arm and this mirror 40 likewise rotates the reference wave by 180° so that flatness deviations of the planar wave 19 incident upon the interferometer do not influence the measuring result. Correspondingly, like oppositely directed differences of the light path length on both sides of the optical axis which occur by tilt and offset are automatically eliminated. This method is applicable only for rotationally symmetrical test components.

Figure 3:
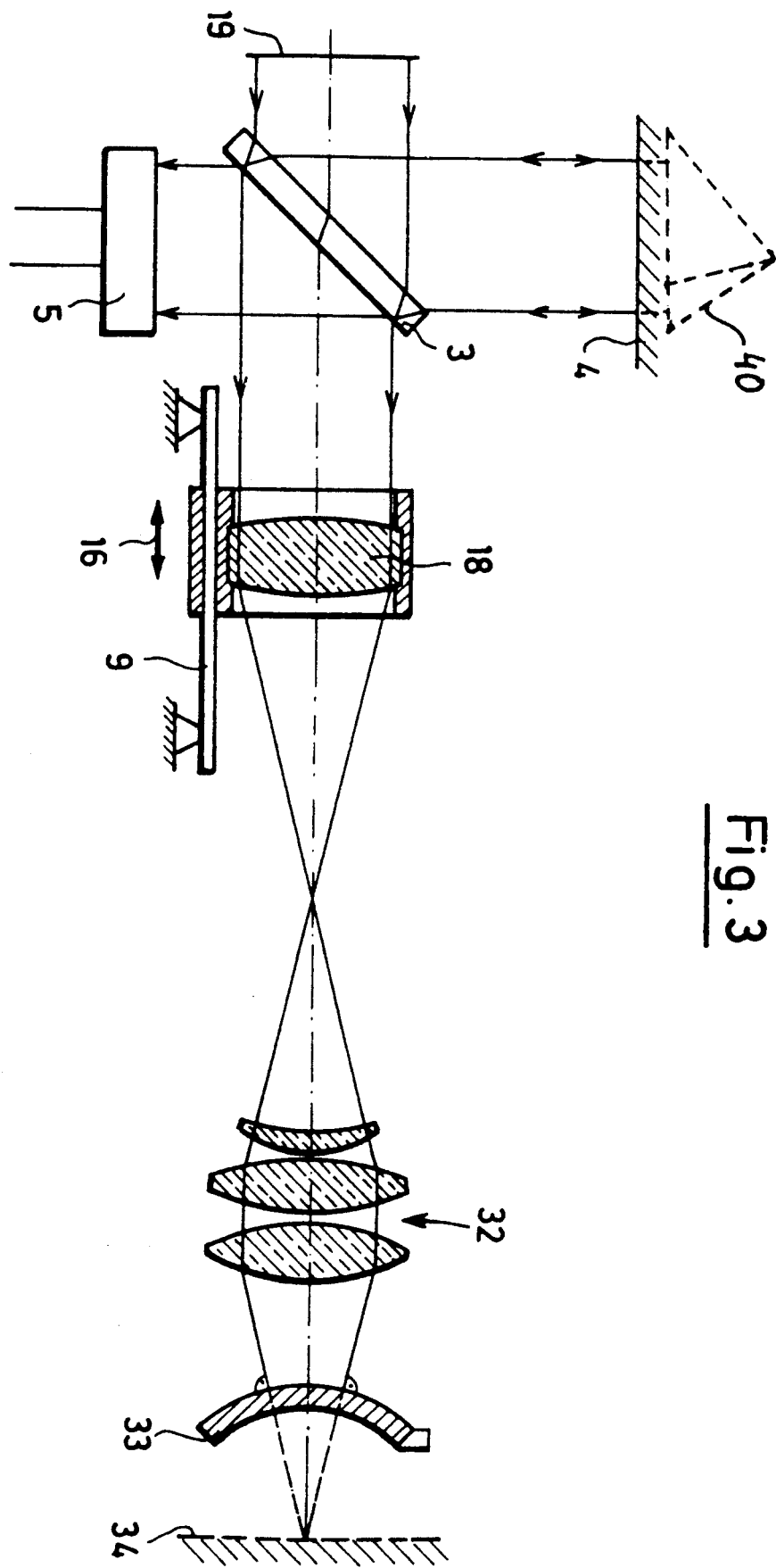
FIG. 3 is a schematic of the test arm of the interferometer of FIG. 1 modified for testing transparent optical components by passing light rays therethrough.

In FIG. 3, a test assembly is shown in the measuring arm of the interferometer by means of which lenses can be tested by passing light therethrough. These lenses include not only individual lenses but also partially assembled optical units or even complete optical units In the embodiment shown, the collimator is identified by reference numeral 18 and the test component by reference numeral 32. A spherical autocollimation mirror 33 is mounted behind the optic to be tested. The radius of this autocollimation mirror 33 is so selected that it corresponds to approximately the wavefront generated by the test component 32 for an average position of the collimator 18.

The measurement of asphericality of the test component 32 is carried out in the manner described with respect to FIG. 1 in that the collimator 18 is displaced into various positions with respect to the test component 32 so that always different aperture regions of the wavefront, deformed aspherically by the test component 32, fulfill the condition for autocollimation, that is, perpendicular incidence on the convex mirror 33. In this arrangement too, the optical path length for the ray running along the axis of the test arm of the interferometer is always the same for all positions of the collimator so that the wavefront does not change in this region. This applies also if the optic 32 to be tested is displaced axially in lieu of the collimator 18.

Figure 4:
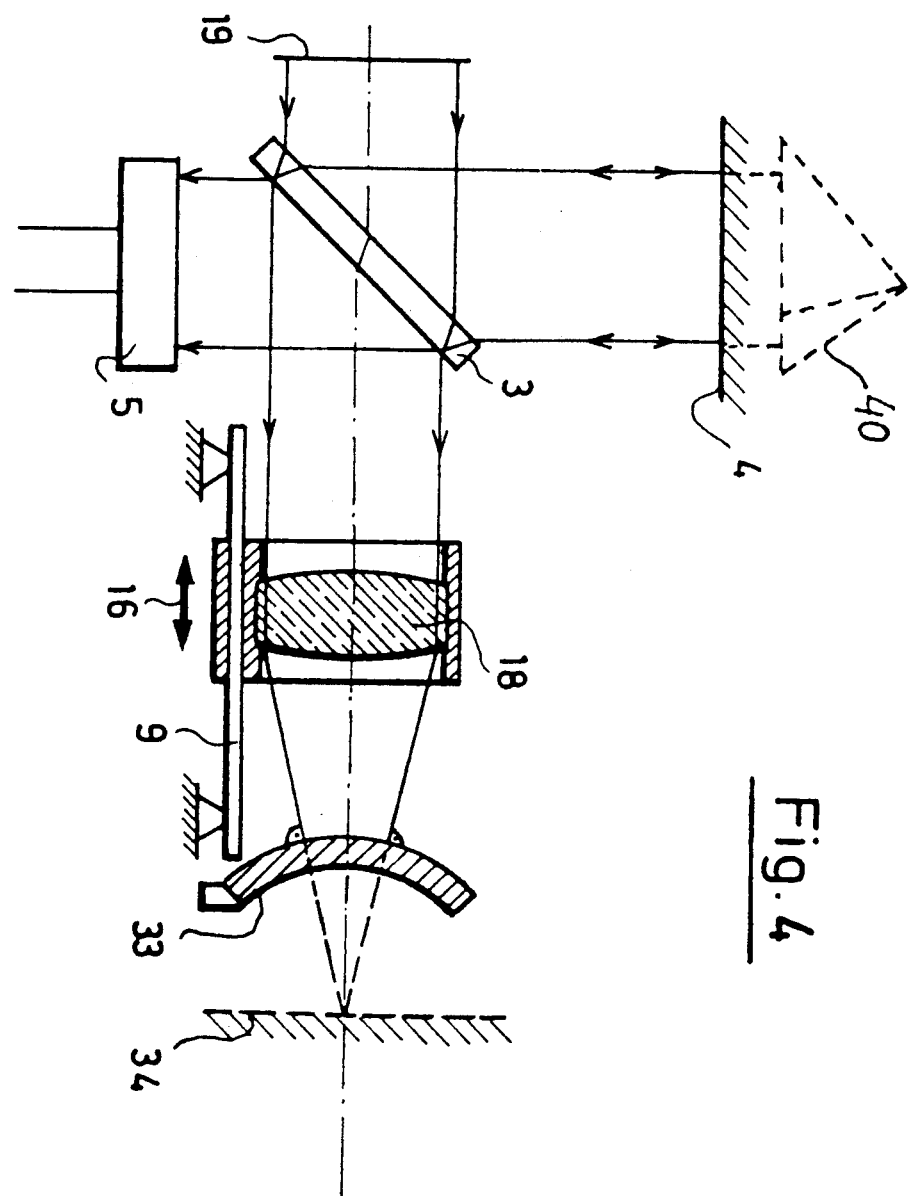
FIG. 4 shows the embodiment of FIG. 3 during a calibration measurement with a remotely disposed test component; and, FIG. 5 is a schematic which shows an alternate embodiment based on a Mach-Zehnder interferometer for testing transparent optical components by passing light rays therethrough.

The form of the wavefront deformed by the test component 32 can be absolutely measured in that the collimator 18 is displaced into a position whereat the same apertures of the beam are obtained for the optic 32 to be tested on the object side and on the image side, that is, the apex focal lengths are approximately equal at both sides of the optic 32. Referring to FIG. 4, the errors of the test arrangement can be completely eliminated if the test component is removed from the beam path in the test arm of the interferometer and if the spherical autocollimation mirror 33 is placed in the position shown there in the convergent beam path behind the collimator 18 and if this mirror 33 is rotated by precisely 180° about the optical axis. The errors which can be removed are the wavefront distortions caused by the beam splitter 3 and the reference mirror 4 of the interferometer as well as the errors of the collimator 18 and of the autocollimation mirror 33. For this purpose, it is simple to form the difference of the light path length differences which can be obtained from the evaluation of the interferograms in the two assemblies shown in FIGS. 3 and 4 with and without the test component.

A cat's-eye is produced by replacing the spherical mirror 33 in FIGS. 3 and 4 by the planar mirror 34 represented by the broken line. The beam falling on the mirror and again emanating therefrom is point symmetrical to the optical axis in the test branch of the interferometer and possible linear errors of the guide 9 are automatically compensated. At the same time, the planar mirror 4 in the reference arm of the interferometer as shown in FIG. 2 is replaced by a triple prism or the triple mirror 40 shown in phantom outline in FIGS. 3 and 4 in order to also rotate the reference wave through 180°. However, this configuration again requires as a condition precedent that the test component be rotationally symmetrical. Point symmetrical errors of the test component such as coma cannot be measured with such a configuration.

The arrangements described in FIGS. 1 to 4 are built upon an interferometer of the Twyman-Green. However, it is equally possible to carry out the method according to the invention with arrangements which are based upon interferometers of the Mach-Zehnder type. Such configurations can be provided especially for the measurement of transparent optics in transmission or non-rotationally symmetrically aspherical mirrors in reflection.

Figure 5:
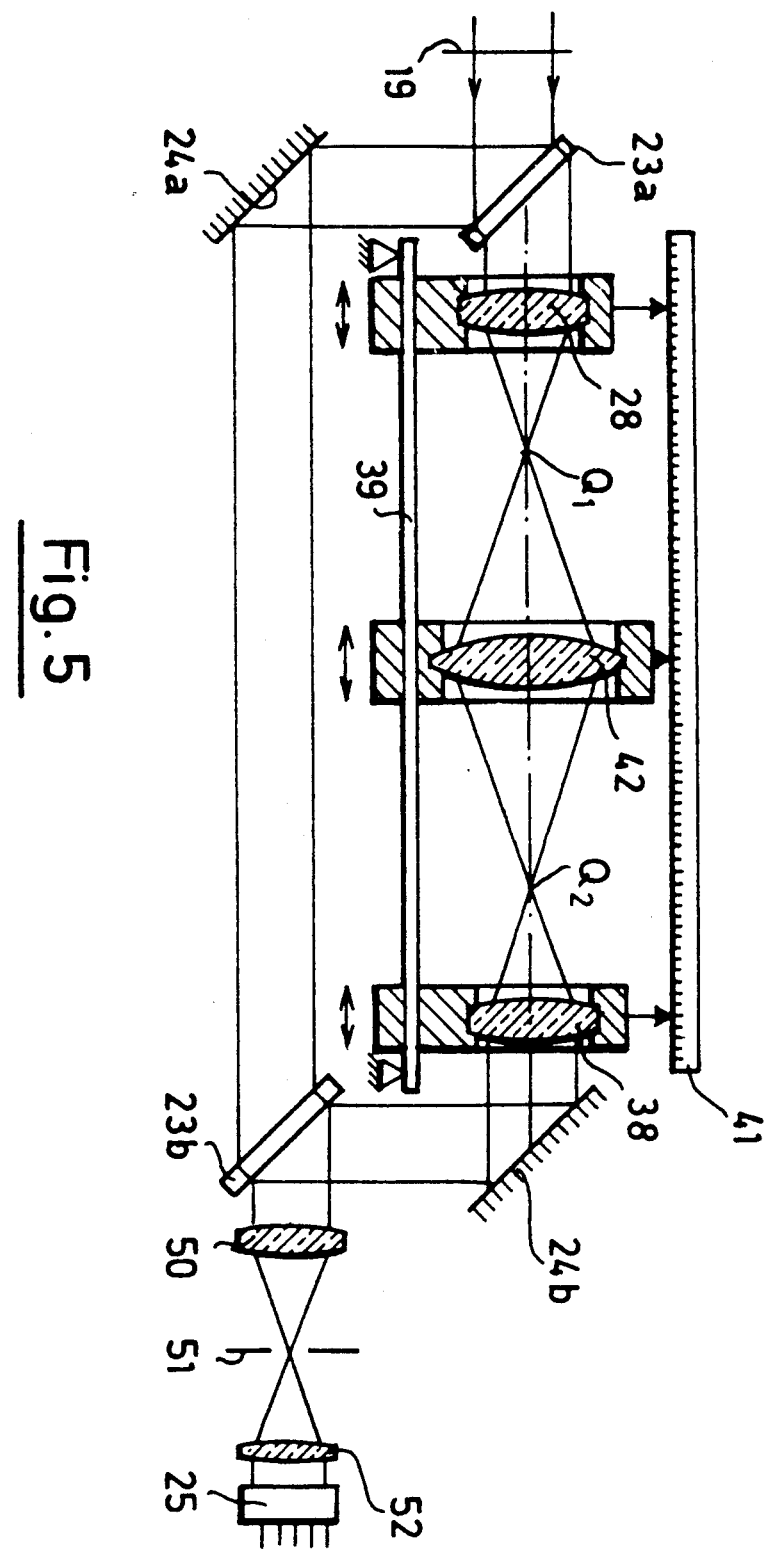

An assembly of this kind based upon a Mach-Zehnder interferometer is shown in FIG. 5. Here, the incident planar wave is again identified by reference numeral 19. The planar wave 19 is split by a first beam splitter 23a into the measuring arm and the testing arm and the component waves reflected at the two planar mirrors (24a, 24b) are again united in the second beam splitter 23b of the Mach-Zehnder interferometer. While the reference arm of the interferometer is empty, the lens 42 to be tested is disposed in the test arm of the interferometer between two collimator objectives (28 and 38). The collimator objectives (28 and 38) can either be corrected systems which transform planar waves into spherical waves or, as shown in FIG. 5, they can be individual lenses. They must not necessarily have the same optical data.

The test component 42 and the two collimators (28 and 38) are displaceable along the optical axis in the test arm of the interferometer by means of the guide 39 as indicated by the arrows. For carrying out the method of the invention, two of the three components are displaced at the same time, namely, either the two collimators (28 and 38) or the test component 42 and one of the two collimators. The two apex distances of the test component 42 to the two collimators (28 and 38) are determined for different distances with the aid of a length measuring system represented in a simple manner as the scale 41. In this way, a zone by zone testing of the asphericality of the test component 42 is again possible. In this connection, care must be taken that, if the beam cross section between the wave entering into the collimator 28 and the wave exiting from the collimator 38 changes, flatness errors of the planar wave 19 entering into the interferometer can go into the result.

The divider mirror 23b brings the two branches of the interferometer together again. An afocal optical system comprising the two lenses (50 and 52) is arranged at the output of the interferometer and behind the divider mirror 23b. This afocal optical system images the test component 42 sharply on the downstream CCD-camera 25 and adapts the cross section of the beam which emanates from the interferometer to the surface of the CCD-camera 25. A diaphragm 51 is arranged at the intermediate focus of this afocal system (50, 52). This diaphragm permits only rays to pass from the compensated region of the test component wherein the wavefront of the test wave has been adapted to the asphericality of the test component 42. In this way, rays outside of the compensated region are prevented from generating disturbing interferences on the photo-sensitive surface of the CCD-camera 25. This optical system (50, 52) can also be positioned ahead of the CCD-camera 5 in the embodiments of FIGS. 1 to 4.

Calibration measurements can again be carried out also in the embodiment of FIG. 5 to eliminate wavefront errors caused by the collimators (28 and 38). For this purpose, the test component 42 is removed from the beam path and the two collimators (28 and 38) are displaced toward each other so that the two focus points Q1 and Q2 are coincident.

It is understood that the foregoing description is that of the preferred embodiments of the invention and that various changes and modifications may be made thereto without departing from the spirit and scope of the invention as defined in the appended claims.

What is claimed is:

1. A method for examining an optical test component which supplies aspherical wavefronts, the method being carried out with the aid of an interferometer having a collimator generating a test wave, the collimator being displaceable relative to the optical test component, the method comprising the steps of:

making interferograms for different positions of the collimator at which component regions of the test wave are adapted to the test component;

measuring the relative position between the collimator and the test component with high precision for said different positions;

electronically registering the interferograms by means of an image sensor and storing said interferograms as light path length differences $L_{act}(h)$ between the test beam and the comparison beam of the interferometer for the individual image points of each interferogram;

computing desired light path length differences $L_{des}(h)$ for the different positions of the collimator;

comparing the interferometrically measured light path length differences $L_{act}(h)$ to said desired light path length differences $L_{des}(h)$ with the phase errors $\Delta\phi(h)$ being formed for the individual image points; and, computing the errors of the aspheric form of the wavefront of the test component as a whole from the comparisons and the phase errors.

2. The method of claim 1, wherein the computation of the form of the wavefront includes a mean value determination by carrying out the following steps: forming the differences of the phase errors, $\Delta\phi(h)$, of respective neighboring image points (xi, dx, yi) and (xi, yi +dy); averaging these differences; and, then integrating the averaged differences into the total wavefront error of the test component.

3. The method of claim 1, wherein the exact form of the wavefront emanating from the collimator is initially computed from the lens data of the collimator and is considered for determining the desired light path length difference, $L_{des}(h)$.

4. The method of claim 1, wherein the exact form of the wavefront emanating from the collimator is initially determined by an interferometric comparison measurement with a surface of known form and is considered for determining the desired light path length difference, $L_{des}(h)$.

5. The method of claim 1, wherein the collimator is moved in both directions (+z, −z) and wherein the measurements, which are obtained for the same positions in both movement runs, are averaged.

6. A method for examining an optical test component which supplies aspherical wavefronts, the method being carried out with the aid of an interferometer having a collimator generating a test wave, the collimator being displaceable relative to the optical test component, the method comprising the steps of:
   making interferograms for different positions of the collimator at which component regions of the test wave are adapted to the test component;
   measuring the relative position between the collimator and the test component with high precision for said different positions;
   electronically registering the interferograms by means of an image sensor and storing said interferograms as light path length differences $L_{act}(h)$ between the test beam and the comparison beam of the interferometer for the individual image points of each interferogram;
   determining desired light path length differences $L_{des}(h)$ by calibration;
   comparing the interferometrically measured light path length differences $L_{act}(h)$ to said desired light path length differences $L_{des}(h)$ with the phase errors $\Delta\phi(h)$ being formed for the individual image points; and,
   computing the errors of the aspheric form of the wavefront of the test component as a whole from the comparisons and the phase errors.

7. The method of claim 6, wherein the computation of the form of the wavefront includes a mean value determination by carrying out the following steps: forming the differences of the phase errors, $\Delta\phi(h)$, of respective neighboring image points (xi, dx, yi) and (xi, yi +dy); averaging these differences; and, then integrating the averaged differences into the total wavefront error of the test component.

8. The method of claim 6, wherein the exact form of the wavefront emanating from the collimator is initially computed from the lens data of the collimator and is considered for determining the desired light path length difference, $L_{des}(h)$.

9. The method of claim 6, wherein the exact form of the wavefront emanating from the collimator is initially determined by an interferometric comparison measurement with a surface of known form and is considered for determining the desired light path length difference, $L_{des}(h)$.

10. The method of claim 6, wherein the collimator is moved in both directions (+z, −z) and wherein the measurements, which are obtained for the same positions in both movement runs, are averaged.

11. An arrangement for examining an optical test component which supplies aspherical wavefronts, the arrangement comprising:
    collimator means for generating a test wave directed toward the test component;
    displacing means for displacing said collimator means and said test component relative to each other;
    interferometer means for forming respective interferograms from the test wave reflected from said test component and from a reference wave for different positions of said collimator means and said test component relative to each other;
    said interferometer means being an interferometer having a separate reference arm wherein the reference waves are formed;
    length measuring means for precisely determining the relative position between said test component and said collimator means; and,
    computer means for receiving said interferograms and for forming the following: the light path length differences, $L_{act}(h)$, determined from the interferograms and the light path length differences, $L_{des}(h)$, computed from the form of the test wave and from the desired form of the test component; said light path length differences, $L_{act}(h)$ and $L_{des}(h)$, being formed for every image point and for every position, s(h), of said collimator means.

12. The arrangement of claim 11, said collimator means being one single lens.

13. The arrangement of claim 12, said test component being a lens or lens system and said arrangement further comprising a mirror mounted behind said test component.

14. The arrangement of claim 11, further comprising an optical double adaptation unit mounted between said interferometer and said collimator means.

15. The arrangement of claim 11, said interferometer being a Mach-Zehnder interferometer having a measuring arm; said collimator means including two collimators arranged in said measuring arm; and, said test component being mounted in said measuring arm so as to be disposed between said collimators.

* * * * *

UNITED STATES PATENT AND TRADEMARK OFFICE
CERTIFICATE OF CORRECTION

PATENT NO. : 5,004,346

DATED : April 2, 1991

INVENTOR(S) : Michael Küchel

It is certified that error appears in the above-identified patent and that said Letters Patent is hereby corrected as shown below:

On the Title page, Item [75] and Item [19], line 2: please delete "Kühel" and substitute -- Küchel -- therefor.

On the title page, item 54: delete "Method of Examining an Optical Component" and substitute --Method of Examining an Optical Component and Arrangement Therefor -- therefor.

column 3, line 7: please add a period after the word "nonuniformities.

UNITED STATES PATENT AND TRADEMARK OFFICE
CERTIFICATE OF CORRECTION

PATENT NO. : 5,004,346
DATED : April 2, 1991
INVENTOR(S) : Michael Küchel

It is certified that error appears in the above-identified patent and that said Letters Patent is hereby corrected as shown below:

In column 7, line 58: delete "ah" and substitute -- an -- therefor.

In column 7, line 68: delete the equation (3) and substitute therefor:
-- $L_{des}(h) = 2 \cdot \{const. - s_0 + [(s_0 - z(h))^2 + h^2]^{\frac{1}{2}}\}$ --

In column 10, line 41: please add a period after the word "units".

Signed and Sealed this

Twenty-third Day of February, 1993

Attest:

STEPHEN G. KUNIN

*Attesting Officer*  *Acting Commissioner of Patents and Trademarks*